United States Patent
Mukai et al.

(10) Patent No.: US 10,900,601 B2
(45) Date of Patent: Jan. 26, 2021

(54) RIGID ENTRY FITTING FOR FLEXIBLE PIPE

(71) Applicant: S. BRAVO SYSTEMS, INC., Commerce, CA (US)

(72) Inventors: Don Mukai, Commerce, CA (US); Micah Nelson, Commerce, CA (US); Maximillian Artin Cohen, Commerce, CA (US); Adam Macias, Commerce, CA (US); Ricardo Burgos, Commerce, CA (US)

(73) Assignee: S. Bravo Systems, Inc., Commerce, CA (US)

( * ) Notice: Subject to any disclaimer, the term of this patent is extended or adjusted under 35 U.S.C. 154(b) by 290 days.

(21) Appl. No.: 16/162,862

(22) Filed: Oct. 17, 2018

(65) Prior Publication Data
US 2019/0113165 A1    Apr. 18, 2019

Related U.S. Application Data

(60) Provisional application No. 62/573,600, filed on Oct. 17, 2017.

(51) Int. Cl.
| | |
|---|---|
| *F16L 19/07* | (2006.01) |
| *F16L 41/08* | (2006.01) |
| *F16L 33/18* | (2006.01) |
| *F16L 21/04* | (2006.01) |
| *F16L 33/32* | (2006.01) |
| *F16L 21/03* | (2006.01) |
| *B67D 7/00* | (2010.01) |
| *F16L 5/06* | (2006.01) |

(52) U.S. Cl.
CPC ............ *F16L 41/08* (2013.01); *B67D 7/00* (2013.01); *F16L 5/06* (2013.01); *F16L 19/07* (2013.01); *F16L 21/03* (2013.01); *F16L 21/045* (2013.01); *F16L 33/18* (2013.01); *F16L 33/32* (2013.01)

(58) Field of Classification Search
CPC ..... F16L 5/06; F16L 5/00; F16L 19/061; F16L 19/065; F16L 19/07
USPC .............. 285/139.1, 139.2, 139.3, 13, 14
See application file for complete search history.

(56) References Cited

U.S. PATENT DOCUMENTS

| | | | | |
|---|---|---|---|---|
| 3,275,347 A | * | 9/1966 | Scott | F16L 5/00 285/139.3 |
| 5,676,183 A | * | 10/1997 | Bravo | F16L 5/06 137/375 |

FOREIGN PATENT DOCUMENTS

FR        2567239 A1 *  1/1986    ............... F16L 5/06

* cited by examiner

*Primary Examiner* — David Bochna
(74) *Attorney, Agent, or Firm* — Lewis Roca Rothgerber Christie LLP

(57) ABSTRACT

A rigid entry fitting configured to form a seal between a flexible pipe segment and a sump wall includes a fitting body having an inner surface defining a tapered opening, an insert received in the tapered opening, a shell received in an opening of the insert, a first pair of gaskets between an outer surface of the insert and the inner surface of the fitting body, a second pair of gaskets contacting an inner surface of the shell and opposite ends of the insert, and a nut configured to engage threads on an outer surface of the fitting body. When the nut is threaded onto the threads, the nut presses the shell and the insert into the tapered opening and presses the first pair of gaskets against the inner surface of the fitting body and the second pair of gaskets against the outer surface of the flexible pipe segment.

18 Claims, 2 Drawing Sheets

RIGID ENTRY FITTING FOR FLEXIBLE PIPE

CROSS-REFERENCE TO RELATED APPLICATION

The present application claims priority to and the benefit of U.S. Provisional Patent Application No. 62/573,600, filed on Oct. 17, 2017 with the U.S. Patent and Trademark Office, the entire content of which is incorporated herein by reference.

FIELD

The present disclosure relates generally to entry fittings for flexible pipes passing through sumps.

BACKGROUND

Underground storage tank (UST) fueling sites, such as retail gas stations, typically include pipelines carrying a product such as gasoline from the storage tank to a product dispenser. A sump is typically provided beneath the product dispenser to contain any fuel released from failed equipment and thereby prevent environmental contamination (e.g., ground water contamination) under and around the service station. Each pipeline extends through an aperture in the wall of the sump to a pipe fitting which connects the pipeline to the product dispenser.

The aperture in the sump wall through which the pipeline penetrates must be sealed to prevent the accumulated fuel in the sump from leaking through the aperture in the sump wall and into the surrounding ground. Accordingly, penetration fittings are commonly provided to form seals between the sumps and the associated pipelines to contain fuel leakage within the sumps. However, penetration fittings commonly include components, such as gaskets and boots, that are made from a material having a relatively low chemical resistance that tend to degrade and fail quickly in the harsh sump environment, and conventional penetration fittings require excavation of the backfill area surrounding the sump to replace worn components of the penetration fitting. Additionally, many conventional penetration fittings are not configured for use with double-walled sumps that enable pressure testing and monitoring of the integrity of the seals formed by the penetration fitting.

SUMMARY

The present disclosure is directed to various embodiment of a rigid entry fitting configured to form a seal between a pipe segment and a sump wall at an aperture in the sump wall through which the pipe segment passes. In one embodiment, the rigid entry fitting includes a fitting body having an inner surface defining a tapered opening and an outer surface opposite the inner surface, an insert configured to be received in the tapered opening, a shell configured to be received in an opening of the insert and defining an opening configured to accommodate the pipe segment, a first pair of gaskets configured to form a seal between an outer surface of the insert and the inner surface of the fitting body, a second pair of gaskets configured to form a seal with an outer surface of the pipe segment, and a nut configured to engage the fitting body. When the rigid entry fitting is assembled around the pipe segment, the nut is configured to press the shell and the insert into the tapered opening of the fitting body, and press the first pair of gaskets against the inner surface of the fitting body and the second pair of gaskets against the outer surface of the pipe segment.

When the rigid entry fitting is assembled, the second pair of gaskets may contact an inner surface of the insert and opposite ends of the shell.

The fitting body may define a first radial opening, the insert may define a second radial opening, the shell may define a third radial opening. When the rigid entry fitting is assembled around the pipe segment and coupled to the sump wall, the first, second, and third radial openings define a communication path from an interstice of the sump wall to the pipe.

The fitting body may also include a flange configured to be coupled to an exterior surface of the sump wall.

The rigid entry fitting may also include a flange configured to fit over the outer surface of the fitting body and configured to be coupled to an interior surface of the sump wall opposite the exterior surface of the sump wall.

The rigid entry fitting may also include a pair of annular grooves in the outer surface of the insert. The pair of annular grooves is configured to accommodate the first pair of gaskets.

When the first pair of gaskets is received in the pair of annular grooves, the first pair of gaskets may extend beyond the outer surface of the insert.

The nut may include a cap, an outer sleeve extending from the cap, and an inner projection extending from the cap.

The outer surface of the fitting body may include outer threads, and an inner surface of the outer sleeve may include inner threads configured to engage the outer threads of the fitting body.

When the rigid entry fitting is assembled and the nut is threaded onto the fitting body, the inner projection of the nut may engage an interior gasket of the second pair of gaskets.

The second pair of gaskets may be larger than the first pair of gaskets.

The first pair of gaskets may include a first pair of O-rings each having a first diameter, and the second pair of gaskets may include a second pair of O-rings each having a second diameter larger than the first diameter.

An outer surface of the insert may taper and may substantially match the inner surface of the fitting body when the rigid entry fitting is assembled around the pipe segment.

The present disclosure is also directed to various embodiments of a rigid entry fitting configured to form a seal between a pipe segment and a sump double wall at an aperture in the sump double wall through which the pipe segment passes. In one embodiment, the rigid entry fitting includes a fitting body having an inner surface defining a tapered opening and an outer surface opposite the inner surface, an insert configured to be received in the tapered opening, a shell configured to be received in an opening of the insert and defining an opening configured to accommodate the pipe segment, and a nut configured to engage the fitting body. When the rigid entry fitting is installed around the pipe segment, a first fluid-tight seal is formed, a second fluid-tight seal is formed, and a communication path is defined in the fitting body, the insert, and the shell. The communication path is between the first and second fluid-tight seals and extends from an interstice of the sump double wall to the pipe segment.

The rigid entry fitting may include a first pair of gaskets configured to form a seal between an outer surface of the insert and the inner surface of the fitting body, and a second pair of gaskets configured to form a seal with an outer surface of the pipe segment. An exterior gasket of the first pair of gaskets and an exterior gasket of the second pair of gaskets define the first fluid-tight seal when the rigid entry fitting is installed around the pipe segment. An interior gasket of the first pair of gaskets and an interior gasket of the second pair of gaskets define the second fluid-tight seal when the rigid entry fitting is installed around the pipe segment.

The fitting body may define a first radial opening, the insert may define a second radial opening, and the shell may define a third radial opening. When the rigid entry fitting is assembled, the first, second, and third radial openings define at least a portion of the communication path from the interstice of the sump double wall to the flexible pipe.

The first, second, and third radial openings may be longitudinally offset from each other.

When the rigid entry fitting is installed around the pipe segment, the first radial opening may be at least partially aligned with the interstice of the sump double wall.

The fitting body may include an inner surface defining a tapered opening.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a rigid entry fitting. The rigid entry fitting is configured to create one or more fluid-tight seals around a pipe penetrating a sump wall. In one or more embodiments, the rigid entry fitting is configured for use with double wall sumps configured to test and monitor the integrity of the seals formed between the rigid entry fitting and the pipe (i.e., the rigid entry fitting is configured for use with double wall monitored systems). Additionally, in one or more embodiments, the rigid entry fitting is configured to enable replacement of worn seals (e.g., O-rings) without requiring excavation of the backfill area surrounding the sump.

Figure 1:
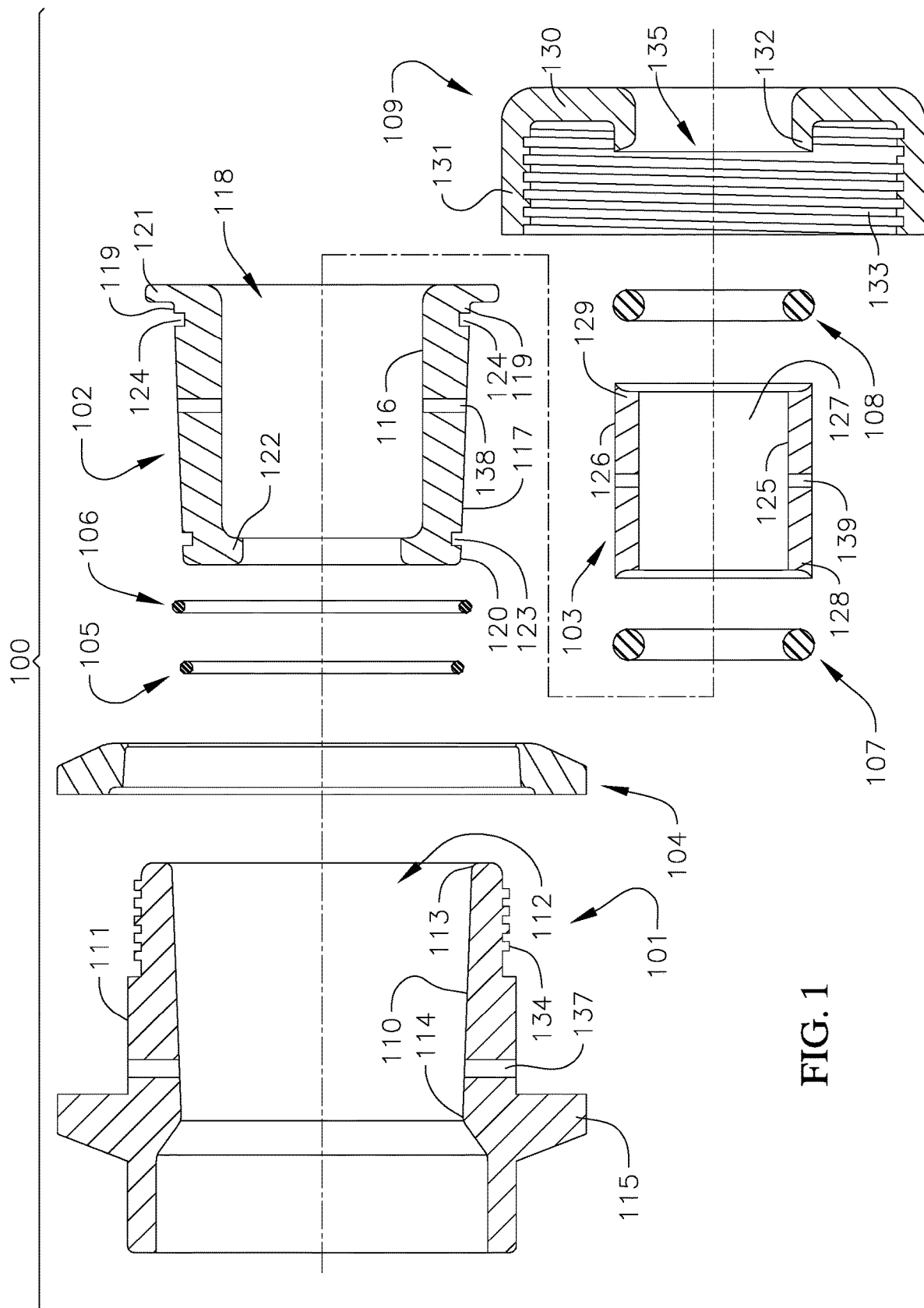
FIG. 1 is an exploded cross-sectional view of a rigid entry fitting according to one embodiment of the present disclosure.
Figure 2:
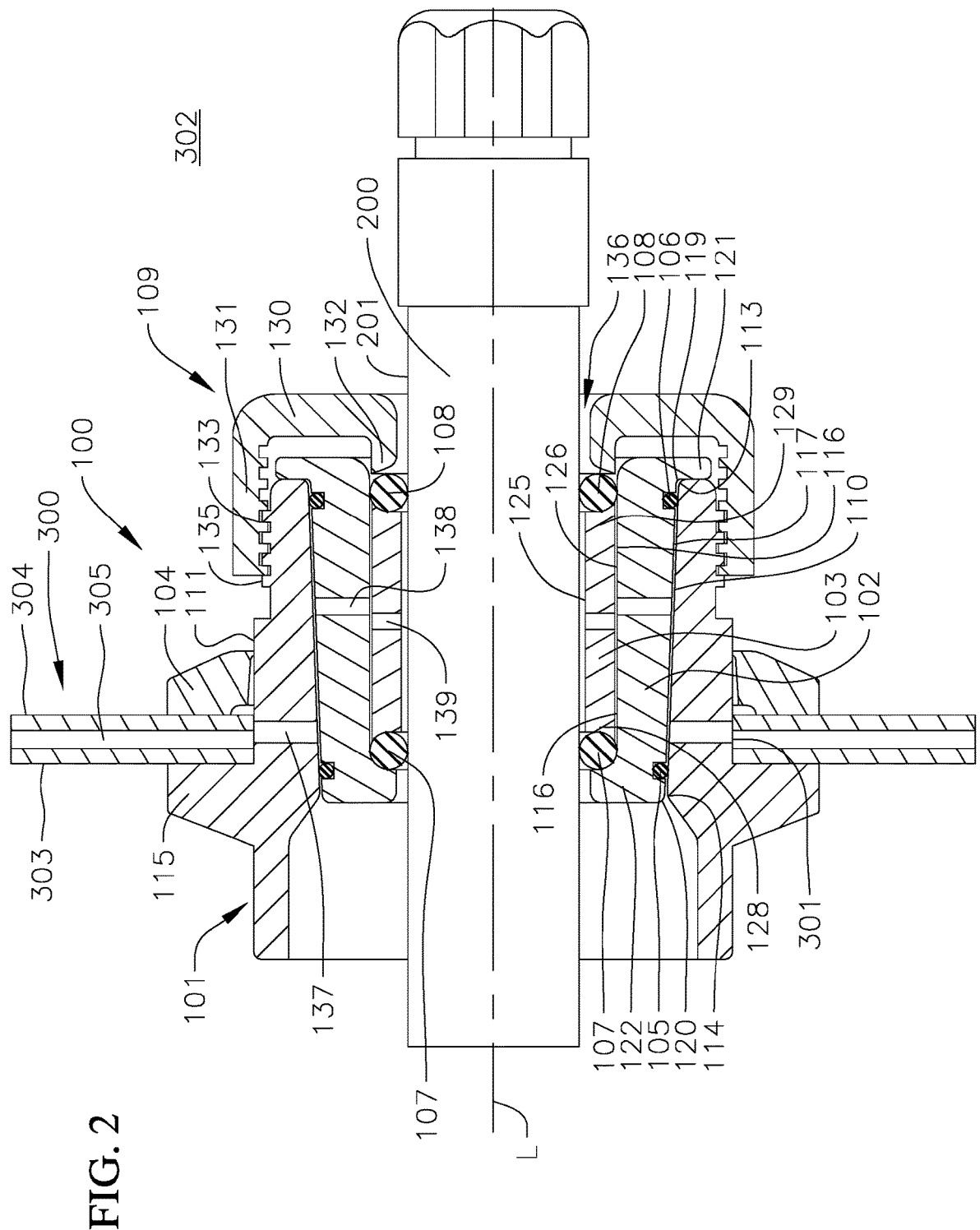
FIG. 2 is an assembled cross-sectional view of the embodiment of the rigid entry fitting illustrated in FIG. 1 forming a seal around a pipe penetrating a sump wall.

With reference now to FIGS. 1-2, a rigid entry fitting 100 according to one embodiment of the present disclosure is configured to form a fluid-tight seal between a pipe 200 and a sump wall 300 (e.g., a sump double wall) at an aperture or opening 301 in the sump wall 300 through which the pipe 200 passes. In one or more embodiments, the pipe 200 is configured to deliver fuel from an underground storage tank (UST) to a fuel dispenser at a fueling site, such as a retail gas station. Additionally, in one or more embodiments, the pipe 200 may include an inner primary pipeline through which the fuel flows and an outer secondary pipeline surrounding the inner primary pipeline configured to contain any fuel that may lead from a damaged inner primary pipeline. In the illustrated embodiment, the rigid entry fitting 100 includes a fitting body 101, an insert 102, a shell 103, a flange 104, a first pair (e.g., an outer pair) of gaskets 105, 106, a second pair (e.g., an inner pair) of gaskets 107, 108, and a compression nut 109. In one or more embodiments, the gaskets 105-108 may be O-rings formed of an elastomeric material, such as rubber. In one or more embodiments, the gaskets 105-108 may be formed of any other suitable material and may have any other suitable configuration for forming fluid-tight seals.

In the illustrated embodiment, the fitting body 101 includes an inner surface 110 and an outer surface 111 opposite the inner surface 110. In the illustrated embodiment, at least a portion of the inner surface 110 defines a tapered opening 112 that tapers between a wider end 113 and a narrower end 114. In one or more embodiments, when the rigid entry fitting 100 is coupled to the sump wall 300, as illustrated in FIG. 2, the narrower end 114 of the inner surface 110 of the fitting body 101 is proximate to the sump wall 300 and the wider end 113 of the of the inner surface 110 of the fitting body 101 is distal to the sump wall 300. Additionally, in the illustrated embodiment, when the rigid entry fitting 100 is coupled to the sump wall 300, the wider end 113 of the inner surface 110 of the fitting body 101 is accommodated in an inner chamber or cavity 302 defined by the sump wall 300 and the narrower end 114 is outside of the inner chamber 302 of the sump wall 300. In one or more embodiments, when the rigid entry fitting 100 is coupled to the sump wall 300, both the wider end 113 and the narrower end 114 of the fitting body 101 may be in the inner chamber 302 of the sump wall 300.

Additionally, in the illustrated embodiment, the fitting body 101 includes a flange 115 configured to be bonded to an exterior surface 303 of the sump wall 300 surrounding the opening 301 in the sump wall 300. In the illustrated embodiment, the flange 115 extends outward (e.g., radially outward) from the outer surface 111. The flange 104 is an annular member configured to slide over the outer surface 111 of the fitting body 101 and be bonded to an interior surface 304 of the sump wall 300 surrounding the opening 301 (e.g., the flange 115 of the fitting body 101 and the flange 104 are configured to engage opposite surfaces 303, 304 of the sump wall 300). Additionally, in one or more embodiments, the configuration (e.g., shape and size) of the flange 115 may be the same or substantially the same as the configuration (e.g., shape and size) of the flange 104. In one or more embodiments, the fitting body 101 may be configured to be coupled to the sump wall 300 in any other suitable manner, such as with a mechanical compression fitting (e.g., one or more fasteners and a gasket).

As shown in the embodiment illustrated in FIGS. 1-2, the insert 102 is configured to be received in the tapered opening 112 of the fitting body 101 (i.e., the tapered opening 112 is configured to accommodate the insert 102). In the illustrated embodiment, the insert 102 is an annular member including an inner surface 116 and an outer surface 117 opposite the inner surface 116. The inner surface 116 defines an opening 118. In the illustrated embodiment, the outer surface 117 tapers between a wider end 119 and a narrower end 120 opposite the wider end 119. In one or more embodiments, when the rigid entry fitting 100 is coupled to the sump wall 300, as illustrated in FIG. 2, the narrower end 120 of the outer surface 117 of the insert 102 is proximate to the sump wall 300 and the wider end 119 of the outer surface 117 is distal to the sump wall 300. Additionally, in the illustrated embodiment, when the rigid entry fitting 100 is coupled to the sump wall 300, the wider end 119 of the outer surface 117 of the insert 102 is accommodated in the inner chamber 302 defined by the sump wall 300 and the narrower end 120 is outside of the inner chamber 302 of the sump wall 300. In one or more embodiments, when the rigid entry fitting 100 is coupled to the sump wall 300, both the wider end 119 and the narrower end 120 of the insert 102 may be in the inner chamber 302 of the sump wall 300. In one or more embodiments, the outer surface 117 of the insert 102 conforms or substantially conforms to the inner surface 110 of the fitting body 101 (e.g., the tapered outer surface 117 of the insert 102 matches or substantially matches the tapered inner surface 110 of the fitting body 101).

Additionally, in the illustrated embodiment, the insert 102 includes an outwardly-extending lip 121 extending away from the opening 118 (e.g., an outwardly-extending rim) at the wider end 119 of the insert 102, and an inwardly-extending lip 122 extending into the opening 118 (e.g., an inwardly-extending rim) at the narrower end 120 of the insert 102. In one or more embodiments, the outwardly-extending lip 121 and/or the inwardly-extending lip 122 may extend radially relative to a centerline L of the insert 102. In the illustrated embodiment, the inner surface 116 of the insert 102 is straight or substantially straight except at the inwardly-extending lip 122 (e.g., the inner surface 116 of the insert 102 is at a constant or substantially constant distance from the centerline L, except at the inwardly-extending lip 122) such that the opening 118 defined by the inner surface 116 of the insert 102 is straight or substantially straight except at the inwardly-extending lip 122.

In the illustrated embodiment, the outer surface 117 of the insert 102 also defines a pair of annular grooves or recesses 123, 124 configured to accommodate the first pair of gaskets 105, 106, respectively. When the rigid entry fitting 100 is assembled, as illustrated in FIG. 2, the gaskets 105, 106 are received in the annular grooves 123, 124, respectively, protrude beyond the outer surface 117 of the insert 102, and contact the inner surface 110 of the fitting body 101 to form a liquid-tight seal. In the illustrated embodiment, the gaskets 105, 106 form a sliding seal with the inner surface 110 of the fitting body 101.

In the embodiment illustrated in FIGS. 1-2, the shell 103 is configured to be received in the opening 118 of the insert 102 (i.e., the opening 118 of the insert 102 is configured to accommodate the shell 103). In the illustrated embodiment, the shell 103 is an annular member including an inner surface 125 and an outer surface 126 opposite the inner surface 125. The inner surface 125 defines an opening 127 configured to accommodate the pipe 200 penetrating the opening 301 in the sump wall 300 (e.g., when the rigid entry fitting 100 is installed, as illustrated in FIG. 2, the pipe 200 extends through the opening 127 of the insert 102). In the illustrated embodiment, the outer surface 126 of the shell 103 conforms or substantially conforms to the inner surface 116 of the insert 102. In the illustrated embodiment, the outer surface 126 of the shell 103 is straight or substantially straight (e.g., the outer surface 126 of the shell 103 does not taper) and the straight or substantially straight outer surface 126 of the shell 103 matches or substantially matches the straight or substantially straight inner surface 116 of the insert 102, or at least a portion thereof. In one or more embodiments, the outer surface 126 of the shell 103 and the inner surface 116 of the insert 102 may each taper.

In the illustrated embodiment, when the rigid entry fitting 100 is assembled, as illustrated in FIG. 2, the exterior gasket 107 of the second pair of gaskets 107, 108 (e.g., the gasket 107 proximate to the sump wall 300) is positioned between a forward end 128 of the shell 103 and the inwardly-extending lip 122 at the narrower end 120 of the insert 102, and the interior gasket 108 of the second pair of gaskets 107, 108 (e.g., the gasket 108 distal to the sump wall 300) contacts a rear end 129 of the shell 103 opposite the forward end 128 (e.g., the gaskets 107, 108 contact opposite ends 128, 129, respectively, of the shell 103). As described in more detail below, the gaskets 107, 108 are configured to form a fluid-tight seal against the pipe 200.

In the illustrated embodiment, the gaskets of the second pair of gaskets 107, 108 are larger than the gaskets of first pair of gaskets 105, 106 (e.g., a diameter of each of the inner O-rings 107, 108 is larger than a diameter of each of the outer O-rings 105, 106). Providing relatively larger inner gaskets 107, 108 (e.g., larger inner O-rings) is configured to accommodate an oblong pipe 200 (e.g., relatively larger inner gaskets 107, 108 are configured to form a fluid-tight seal against an oblong pipe 200).

In the embodiment illustrated in FIGS. 1-2, the compression nut 109 includes a cap 130, an outer sleeve 131 extending (e.g., extending longitudinally) from the cap 130, and an inner projection 132 extending (e.g., extending longitudinally) from the cap 130. In the illustrated embodiment, the outer sleeve 131 and the inner projection 132 extend in the same or substantially the same direction from the cap 130. When the rigid entry fitting 100 is assembled, as illustrated in FIG. 2, the compression nut 109 is accommodated inside the inner chamber 302 defined by the sump wall 300 and the outer sleeve 131 and the inner projection 132 of the compression nut 109 both extend toward the sump wall 300. In the illustrated embodiment, an inner surface 133 of the outer sleeve 131 includes internal threads 134 configured to engage external threads 135 on the outer surface 111 of the fitting body 101. In one or more embodiments, the outer sleeve 131 is spaced outwardly apart from the inner projection 132 of the compression nut 109 by a distance that is equal or substantially equal to a combined thickness of the fitting body 101 and the insert 102 (e.g., the outer sleeve 131 is spaced outwardly apart from the inner projection 132 of the compression nut 109 by a distance that is equal or substantially equal to a sum of the distance between the inner and outer surfaces 110, 111 of the fitting body 101 and the distance between the inner and outer surfaces 125, 126 of the insert 102). The inner projection 132 of the compression nut 109 is configured to engage the interior gasket 108 of the second pair of gaskets 107, 108. The compression nut 109 also defines an opening 136 configured to accommodate the flexible pipe 200 (e.g., when the rigid entry fitting 100 is installed, the pipe 200 passes through the opening 136 of the compression nut 109). In the illustrated embodiment, the inner projection 132 extends around the opening 136 in the compression nut 109.

To install the rigid entry fitting 100 and form a seal around the pipe 200 passing through the opening 301 in the sump wall 300, the fitting body 101 is inserted through the opening 301 and coupled to the exterior surface 303 of the sump wall 300 around the opening 301 (e.g., by bonding the flange 115 to the portion of the exterior surface 303 of the sump wall 300 surrounding the opening 301 in the sump wall 300 and/or by coupling the fitting body 101 to the sump wall 300 with a mechanical compression fitting, such as with a gasket and fasteners).

Installing the rigid entry fitting 100 also includes installing the first pair of gaskets 105, 106 on the outer surface 117 of the insert 102. In one or more embodiments, the first pair of gaskets 105, 106 may be installed in the annular grooves 123, 124, respectively, in the outer surface 117 of the insert 102. As described above, in one or more embodiments, when the first pair of gaskets 105, 106 may be installed in the annular grooves 123, 124, respectively, the first pair of gaskets 105, 106 extend outward beyond the outer surface 117 of the insert 102.

The insert 102 and the shell 103 may then be inserted into the tapered opening 112 of the fitting body 101 from the interior chamber 302 defined by the sump wall 300. In one embodiment, the insert 102 is inserted into the tapered opening 112 of the fitting body 101 and then the shell 103 is inserted into the opening 118 of the insert 102. In another embodiment, the shell 103 may be inserted into the opening 118 of the insert 102 and then the insert 102 and the shell 103 may be inserted together into the tapered opening 112 of the fitting body 101. In either case, the exterior gasket 107 of the second pair of gaskets 107, 108 is inserted into the opening 118 of the insert 102 ahead of the shell 103. When the exterior gasket 107 is installed, as illustrated in FIG. 2, the exterior gasket 107 contacts the inner surface 116 and the inwardly-extending lip 122 of the insert 102. The inwardly-extending lip 122 is configured to retain the exterior gasket 107 in the opening 118. The interior gasket 108 of the second pair of gaskets 107, 108 may then be inserted into the opening 118 of the insert 102 following the shell 103. When the interior gasket 108 is installed, as illustrated in FIG. 2, the interior gasket 108 contacts the inner surface 116 of the insert 102 and the rear end 129 of the shell 103. In one or more embodiments, the exterior gasket 107 may be connected (e.g., bonded) to the forward end 128 of the shell 103 and the interior gasket 108 may be connected (e.g., bonded) to the rear end 129 of the shell 103 such that the second pair of gaskets 107, 108 and the shell 103 are inserted together into the opening 118 of the insert 102. Additionally, as the insert 102 is inserted into the opening 112 of the fitting body 101, the tapered inner surface 110 of the fitting body 101 and the corresponding tapered outer surface 117 of the insert 102 cooperate to compress (e.g., deform) the first pair of gaskets 105, 106 against the inner surface 110 of the fitting body 101. Furthermore, in the illustrated embodiment, the outwardly-extending lip 121 of the insert 102 is configured to contact the fitting body 101 and thereby function as a stop limiting further insertion of the insert 102 into the opening 112 of the fitting body 101.

The compression nut 109 may then be installed. In one or more embodiments, the compression nut 109 may be installed by threading the threads 134 of the compression nut 109 onto the threads 135 on the outer surface 111 of the fitting body 101. As the compression nut 109 is threaded onto the threads 135 on the outer surface 111 of the fitting body 101, the inner projection 132 of the compression nut 109 extends into the opening 118 of the insert 102, engages the interior gasket 108 of the second pair of gaskets 107, 108, and presses the interior gasket 108 against the rear end 129 of the shell 103 and an outer surface 201 of the pipe 200. Additionally, the compressive force applied by the compression nut 109 to the interior gasket 108 is transmitted through the shell 103 to the exterior gasket 107, which presses the exterior gasket 107 of the second pair of gaskets 107, 108 against the inwardly-extending lip 122 of the insert 102 and the outer surface 201 of the pipe 200. The deformation (e.g., compression) of the gaskets 107, 108 is configured to form a seal against the pipe 200 penetrating the opening 301 in the sump wall 300. Accordingly, the interior gaskets 106, 108 are configured to form a first fluid-tight seal (e.g., an interior seal) and the exterior gaskets 105, 107 are configured to form a second fluid-tight seal (e.g., an exterior seal).

The separate insert 102 and shell 103 components provide access to the gaskets 105-108 through the interior chamber 302 the sump wall 300 without excavation (e.g., without requiring excavation of the backfill area around the sump wall 300). Access to the gaskets 105-108 facilitates servicing the gaskets 105-108 due to wear (e.g., facilitates replacement or retrofitting of the gaskets 105-108). For instance, in one or more embodiments, if the gaskets 105-108 chemically degrade due to exposure to the harsh sump environment or otherwise fail, the compression nut 109 may be detached from the fitting body 101 and then the insert 102 and the shell 103 may be removed from the tapered opening 112 of the fitting body 101 to enable removal and replacement of the gaskets 105-108. Additionally, providing the insert 102 and the shell 103 as separate components enables removal of the insert 102 and the shell 103 to increase the inner diameter of the entry fitting 100. Increasing the inner diameter of the entry fitting 100 enables retraction of the pipe 200 from the opening 301 in the sump wall 300. Furthermore, providing the insert 102 and the shell 103 as separate removable components is configured to reduce the amount of deformation (e.g., compression) that is required on the gaskets 105-108 to form fluid-tight seals compared to a rigid entry fitting in which the insert and the shell are a single monolithic component.

With continued reference to the embodiment illustrated in FIGS. 1-2, the fitting body 101, the insert 102, and the shell 103 each include one or more radial openings 137, 138, 139, respectively. Together, the radial openings 137, 138, 139 define a communication path from an interstice 305 of the sump wall 300 (e.g., a space between a double wall of the sump wall 300) to the pipe 200. The communication path enables pressure testing and monitoring of the integrity of the seals formed by the gaskets 105-108, and it makes the rigid entry fitting 100 compliant with vacuum, pressure, or hydrostatic (VPH) methods for continuous monitoring of the interstice 305 of the sump double wall 300. In the illustrated embodiment, the one or more radial openings 139 in the shell 103 are located at an intermediate portion of the shell 103 between the ends 128, 129, the one or more radial openings 138 in the insert 102 are located at an intermediate portion of the insert 102 between the wider and narrower ends 119, 120, and the one or more radial openings 137 in the fitting body 101 are located between the flange 115 and the wider end 113 of the tapered opening 112. In the illustrated embodiment, the radial openings 137, 138, 139 are each positioned longitudinally between the exterior gaskets 105, 107 and interior gaskets 106, 108. Additionally, the radial openings 137, 138, 139 in the fitting body 101, the insert 102, and the shell 103, respectively, are longitudinally offset from each other. In the illustrated embodiment, the one or more radial openings 137 in the fitting body 101 is at least partially aligned with the interstice 305 of the sump wall 300. Furthermore, in the illustrated embodiment, the first seal formed by the interior gaskets 106, 108 and the second seal formed by the exterior gaskets 105, 107 are on opposite sides of the interstice 305 of the sump double wall 300. In the illustrated embodiment, the communication path from the interstice 305 of the sump wall 300 to the outer surface 201 of the pipe 200 extends through the radial opening 137 in the fitting body 101, along an interface between the outer surface 117 of the insert 102 and the inner surface 110 of the fitting body 101, through the radial opening 138 in the insert 102, along an interface between the outer surface 126 of the shell 103 and the inner surface 116 of the insert 102, and through the radial opening 139 of the shell 103, which opens to the outer surface 201 of the pipe 200. In one or more embodiments, one or more of the radial openings 137, 138, 139 may be at least partially aligned (e.g., aligned or substantially aligned) or with each other.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "inner," "outer," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

What is claimed is:

1. A rigid entry fitting configured to form a seal between a pipe segment and a sump wall at an aperture in the sump wall through which the pipe segment passes, the rigid entry fitting comprising:
   a fitting body having an inner surface defining a tapered opening and an outer surface opposite the inner surface;
   an insert configured to be received in the tapered opening;
   a shell configured to be received in an opening of the insert and defining an opening configured to accommodate the pipe segment;
   a first pair of gaskets configured to form a seal between an outer surface of the insert and the inner surface of the fitting body;
   a second pair of gaskets configured to form a seal with an outer surface of the pipe segment; and
   a nut configured to engage the fitting body,
   wherein, when the rigid entry fitting is assembled around the pipe segment, the nut is configured to press the shell and the insert into the tapered opening of the fitting body, and press the first pair of gaskets against the inner surface of the fitting body and the second pair of gaskets against the outer surface of the pipe segment.

2. The rigid entry fitting of claim 1, wherein, when the rigid entry fitting is assembled, the second pair of gaskets contacts an inner surface of the insert and opposite ends of the shell.

3. The rigid entry fitting of claim 1, wherein:
   the fitting body defines a first radial opening,
   the insert defines a second radial opening,
   the shell defines a third radial opening,
   when the rigid entry fitting is assembled around the pipe segment and coupled to the sump wall, the first, second, and third radial openings define a communication path from an interstice of the sump wall to the pipe segment.

4. The rigid entry fitting of claim 1, wherein the fitting body further comprises a flange configured to be coupled to an exterior surface of the sump wall.

5. The rigid entry fitting of claim 4, further comprising a flange configured to fit over the outer surface of the fitting body and configured to be coupled to an interior surface of the sump wall opposite the exterior surface of the sump wall.

6. The rigid entry fitting of claim 1, further comprising a pair of annular grooves in the outer surface of the insert, the pair of annular grooves configured to accommodate the first pair of gaskets.

7. The rigid entry fitting of claim 6, wherein, when the first pair of gaskets is received in the pair of annular grooves, the first pair of gaskets extend beyond the outer surface of the insert.

8. The rigid entry fitting of claim 1, wherein the nut comprises:
   a cap;
   an outer sleeve extending from the cap; and
   an inner projection extending from the cap.

9. The rigid entry fitting of claim 8, wherein:
   the outer surface of the fitting body comprises outer threads; and
   an inner surface of the outer sleeve comprises inner threads configured to engage the outer threads of the fitting body.

10. The rigid entry fitting of claim 9, wherein, when the rigid entry fitting is assembled and the nut is threaded onto the fitting body, the inner projection of the nut engages an interior gasket of the second pair of gaskets.

11. The rigid entry fitting of claim 1, wherein the second pair of gaskets is larger than the first pair of gaskets.

12. The rigid entry fitting of claim 11, wherein:
   the first pair of gaskets comprises a first pair of O-rings each having a first cross-sectional diameter, and
   the second pair of gaskets comprises a second pair of O-rings each having a a second cross-sectional diameter larger than the first diameter.

13. The rigid entry fitting of claim 1, wherein an outer surface of the insert tapers and substantially matches the inner surface of the fitting body when the rigid entry fitting is assembled around the pipe segment.

14. A rigid entry fitting configured to form a seal between a pipe segment and a sump double wall at an aperture in the sump double wall through which the pipe segment passes, the rigid entry fitting comprising:
   a fitting body having an inner surface defining a tapered opening and an outer surface opposite the inner surface;
   an insert configured to be received in the tapered opening;
   a shell configured to be received in an opening of the insert and defining an opening configured to accommodate the pipe segment; and
   a nut configured to engage the fitting body,
   wherein, when the rigid entry fitting is installed around the pipe segment:
   a first fluid-tight seal is formed,
   a second fluid-tight seal is formed, and
   a communication path is defined in the fitting body, the insert, and the shell, the communication path being between the first and second fluid-tight seals and extending from an interstice of the sump double wall to the pipe segment.

15. The rigid entry fitting of claim 14, further comprising:
   a first pair of gaskets configured to form a seal between an outer surface of the insert and the inner surface of the fitting body; and a second pair of gaskets configured to form a seal with an outer surface of the pipe segment, wherein an exterior gasket of the first pair of gaskets and an exterior gasket of the second pair of gaskets define the first fluid-tight seal when the rigid entry fitting is installed around the pipe segment, and wherein an interior gasket of the first pair of gaskets and an interior gasket of the second pair of gaskets define the second fluid-tight seal when the rigid entry fitting is installed around the pipe segment.

16. The rigid entry fitting of claim 14, wherein:

the fitting body defines a first radial opening, the insert defines a second radial opening, the shell defines a third radial opening, and when the rigid entry fitting is assembled, the first, second, and third radial openings define at least a portion of the communication path from the interstice of the sump double wall to the flexible pipe.

17. The rigid entry fitting of claim 16, wherein the first, second, and third radial openings are longitudinally offset from each other.

18. The rigid entry fitting of claim 16, wherein, when the rigid entry fitting is installed around the pipe segment, the first radial opening is at least partially aligned with the interstice of the sump double wall.

\* \* \* \* \*